United States Patent [19]

Lotteau et al.

[11] 4,298,210

[45] Nov. 3, 1981

[54] DEVICE ALLOWING A SAFETY CONNECTION BETWEEN THE PEDAL OF A BICYCLE AND THE SHOE WORN BY THE CYCLIST

[76] Inventors: Jacques Lotteau, 22, rue de Breteuil, 78670 - Villennes sur Seine; Jacques Bruker, 13, rue Boileau, 75016 - Paris; Charles Freche, 9, rue Villebois-Mareuil, 75017 - Paris, all of France

[21] Appl. No.: 123,161

[22] Filed: Feb. 21, 1980

[30] Foreign Application Priority Data

Feb. 21, 1979 [FR] France ................................ 79 04413

[51] Int. Cl.³ .............................................. B62M 1/02
[52] U.S. Cl. .................................... 280/259; 280/11.3
[58] Field of Search .............. 280/259, 260, 261, 607, 280/11.3, 613

[56] References Cited

U.S. PATENT DOCUMENTS

| 2,244,719 | 6/1941 | Mansfield | 280/11.3 |
| 3,902,729 | 9/1975 | Pruss | 280/613 |
| 3,942,809 | 3/1976 | Sittmar | 280/613 |
| 3,942,811 | 3/1976 | Salomon | 280/613 |
| 3,963,251 | 6/1976 | Miano | 280/11.3 X |
| 3,977,688 | 8/1976 | Imagawa | 280/607 X |

*Primary Examiner*—Joseph F. Peters, Jr.
*Assistant Examiner*—Norman L. Stack, Jr.
*Attorney, Agent, or Firm*—Fisher, Christen & Sabol

[57] ABSTRACT

A device for providing a positive pushing or pulling connection between a bicycle pedal and the shoe worn by the cyclist, which includes a cylindrically projecting assembly to be attached to the pedal and a cylindrically recessed assembly to be fitted into the sole of the shoe. The recessed assembly is provided with radially inwardly directed lugs which can be received into a series of peripheral L-shaped slots in the assembly attached to the pedal so that by partial rotation of the foot a bayonet-type connection is made between the cyclist shoe and the pedal.

6 Claims, 7 Drawing Figures

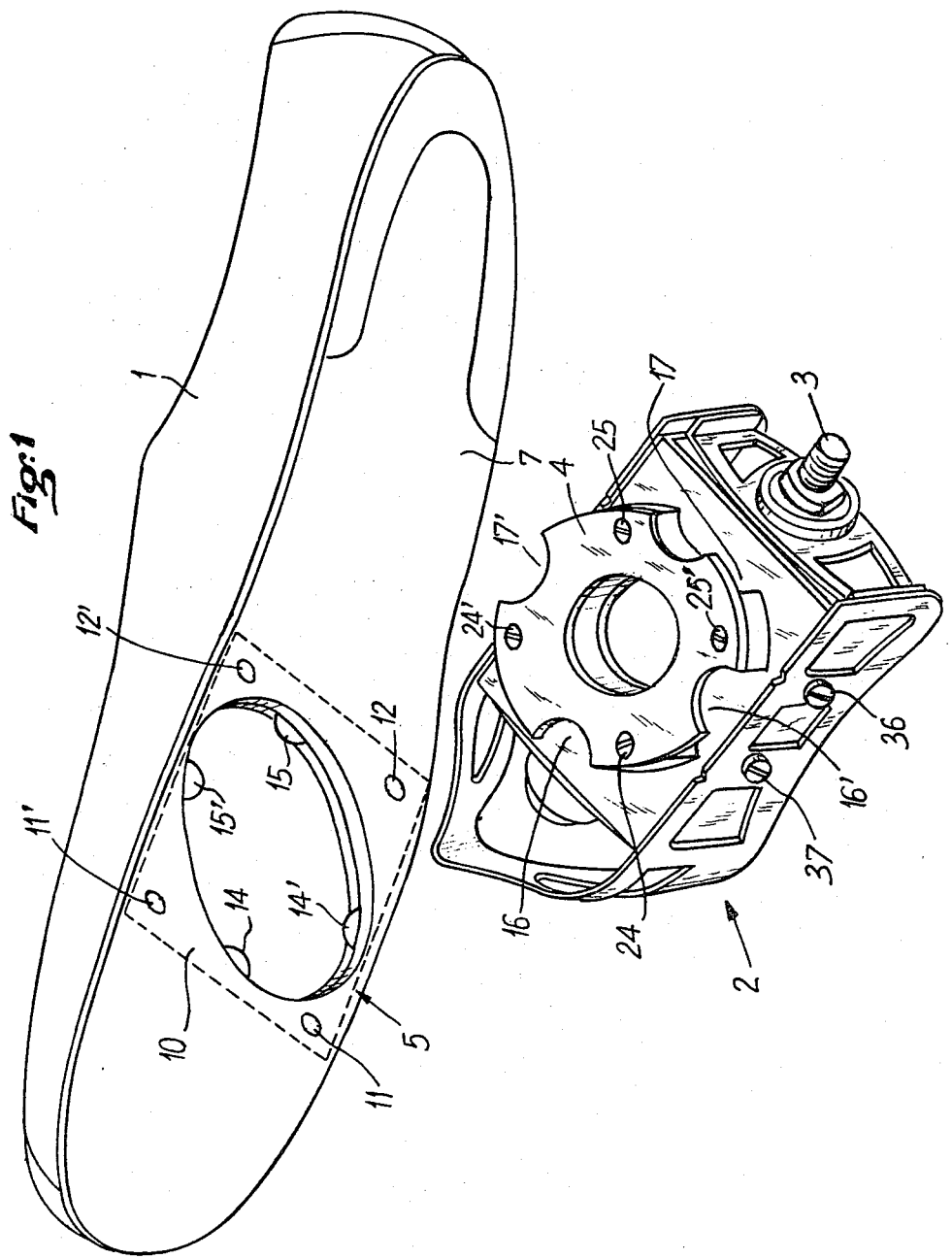

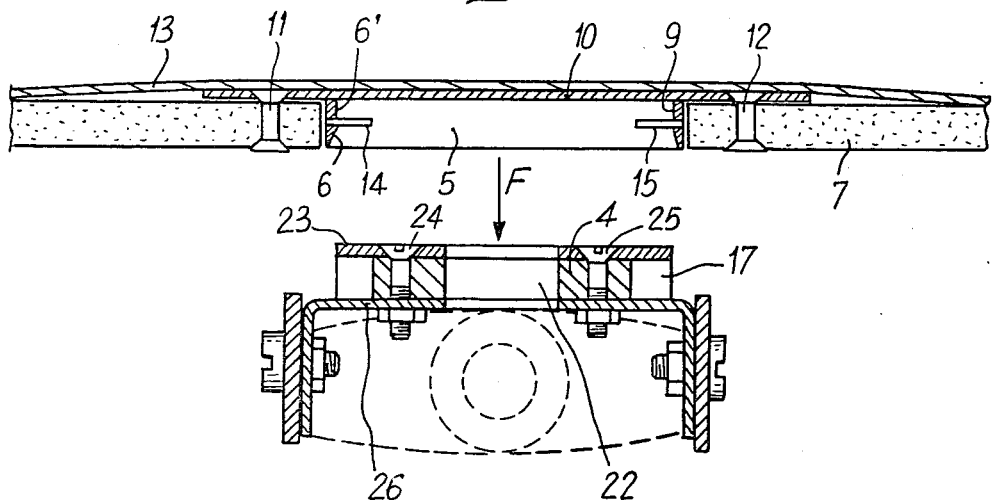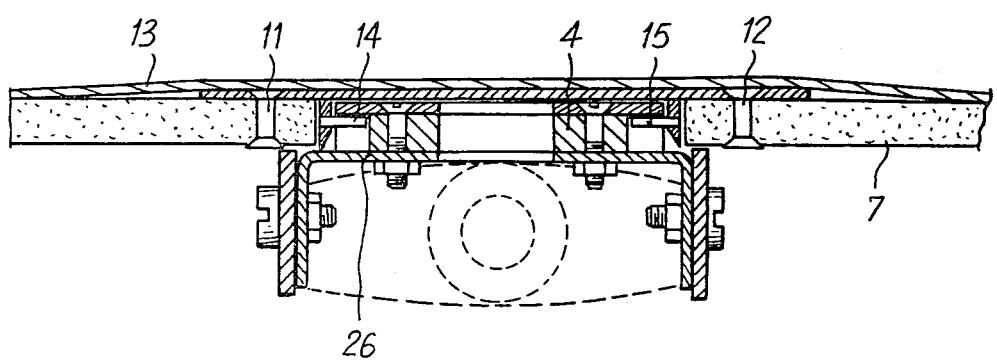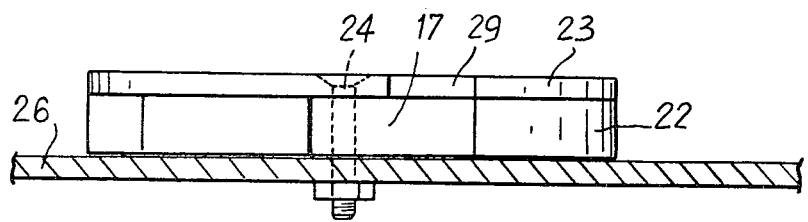

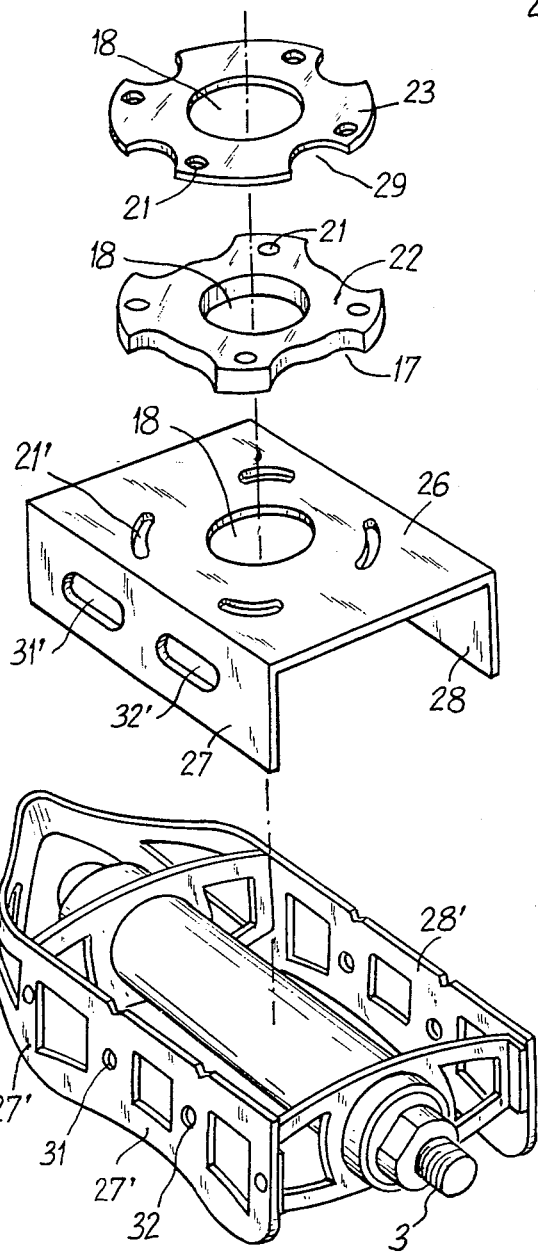
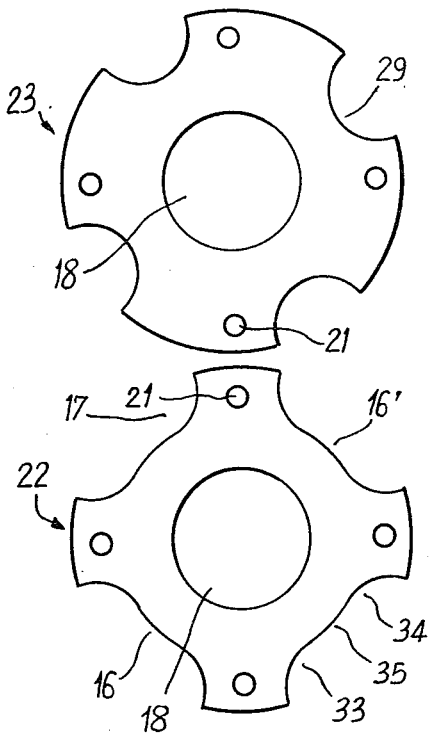
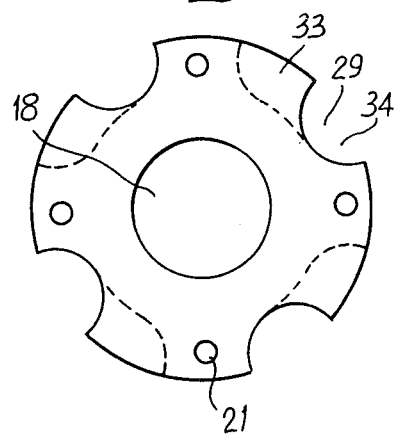

DEVICE ALLOWING A SAFETY CONNECTION BETWEEN THE PEDAL OF A BICYCLE AND THE SHOE WORN BY THE CYCLIST

The present invention relates to a device allowing a safety connection between the pedal of a bicycle and the shoe worn by the cyclist.

Attempts have already been made to connect the cyclist's foot on the pedal in such a way that the leg has a pushing and pulling action.

Conventional toe-clips are known which strap the foot on the pedal, but which interfere somewhat with the circulation of blood and represent a permanent risk of accident in the case of a fall, as the cyclist can only rarely free him/herself in time. In addition, the toe-clips do not allow the slight horizontal rotation of the foot on the pedal, which is made naturally by numerous cyclists (physiological rotation).

Other removable fixing devices have also been produced for releasing the foot more quickly; for example, French Pat. No. 2 315 875 discloses a pawl engagement device, the pawl mounted on the sole of the shoe engaging in rotation in a housing made in the pedal; however, this device presents other drawbacks; in fact, the pawl forming projection under the shoe causes wear and tear of the pieces and hinders the user when walking; the fixing of the pawl on the sole raises delicate problems whilst the device necessitates a special pedal mounted on the cycle, without allowing an adjustment adapted to the cyclist's morphology.

It is an object of the present invention to remedy these drawbacks by providing a device leading to the desired technical result whilst avoiding the drawbacks mentioned hereinabove.

To this end, the invention relates to a device for the safe connection between a bicycle pedal and the shoe worn by the cyclist, with a view to ensuring, firstly, the pulling manoeuvre of the pedal by the cyclist's foot, secondly, the instantaneous release of the foot in case of accident, and thirdly the possibility of making a physiological horizontal rotation of the foot without disconnecting the pedal from the shoe. The device according to the invention is constituted by two mutually fitting, respectively male and female members, one mounted fast on the pedal and the other on the shoe, these interfitting members being provided with locking means adapted to be put to use by simple displacement of the shoe with respect to the pedal, and is characterised in that the male member is in the form of a cylindrical block and is disposed on the pedal, and the female member is constituted by a housing of complementary shape for receiving said block and is disposed in the thickness of the sole of the shoe.

The locking devices are preferably of the bayonet type and they are formed by a plurality of radially extending lugs disposed on one of the interfitting members, the lugs cooperating with receiving recesses disposed on the other member, allowing, in a manner well known, the engagement of the lugs by an axial movement along the axis of the cylindrical block, followed by a locking by rotation (for the connecting manoeuvre), and, on the other hand, allowing the unlocking by rotation followed by an axial disengagement (for the disconnecting manoeuvre).

The arrangement according to which the block is disposed on the pedal and the housing for receiving the block is disposed in the thickness of the sole of the shoe does not cause any wear or tear or hindrance when the cyclist dismounts, as no piece projects with respect to the plane of the sole.

If the user does not wish to connect his shoe to the pedal, it suffices to turn the pedal over and thus abut on the other face of the pedal.

The invention will be more readily understood on reading the following description with reference to the accompanying drawings, in which:

FIG. 1 shows a view in perspective of a pedal provided with the device according to the invention associated with a shoe provided with the complementary member.

FIG. 2 shows a view in longitudinal (with respect to the foot) and transverse (with respect to the pedal) section of the connecting device in disconnected position.

FIG. 3 shows the same elements in connected position.

FIG. 4 shows an exploded view of an embodiment of the connecting block and the U-shaped plate supporting the block.

FIG. 5 shows a view in side elevation of the block, the various elements shown in exploded position in the preceding Figure, being in assembled position.

FIG. 6 shows a plan view of the two pieces constituting the block, before assembly.

FIG. 7 is a plan view of the block after said two pieces have been assembled.

Referring now to the drawings, the Figures show that the device according to the invention associates a shoe 1, which is preferably a cyclist's shoe of conventional type, and a likewise conventional pedal 2 mounted on its pin 3.

The invention provides a connecting device comprising a male cylindrical block 4 adapted to fit into its receiving housing 5, with slight clearance to allow the reciprocal movement of the two members without notable friction.

The block 4 is firstly engaged in the housing in an axial movement (in the direction of arrow F shown in FIG. 2).

The housing is here constituted by a substantially cylindrical body 9 adapted to receive the block 4 and this body 9 is mounted fast on a support plate 10. To allow the easy introduction of the block into the housing, the body 9 comprises a truncated portion 6 whose small diameter is equal to that of the cylindrical portion 6' of the body 9 and whose large diameter is located at the base of the body 9. The cylindrical portion 6' has a diameter allowing, with a slight clearance, the fitting of the block into the housing. The truncated portion 6 will enable the user more easily to find, by self-centering, the correct location of the block for penetration thereof into the housing.

The housing body 9 is positioned in its corresponding recess made in the thickness of the sole 7, whilst the upper plate 10 rests on the inner face of the sole, and this plate 10 is connected to the part of the sole around the recess receiving the cylindrical body 9 by a set of rivets 11, 11', 12, 12'.

An insole 13 is added to the plate 10 and thus ensures the continuity of the inner surface of the shoe, the plate not being felt under the cyclist's sole.

Axially extending horizontal lugs 14,14',15,15' are mounted on the inner wall of the body 9 of the housing 5. Said lugs are preferably mounted in the zone of join between the cylindrical portion 6' and the truncated portion 6.

These lugs form with the L shaped recesses 16,16', 17,17' a locking unit of the well known bayonet type.

FIGS. 1 and 2 show in particular that the shoe is suitably positioned on the pedal so that the housing is located above the block; the whole of the block penetrates into the housing in the direction of arrow F (FIG. 2), i.e. in axial direction, after which the rotation of the shoe, by a given value of between 20° and 35° ensures the penetration of the lugs 14,14',15,15' into the L shaped recesses 16,16',17,17'. In this position, the housing is locked on the block so that the shoe is thus connected to the pedal, whilst allowing the physiological rotation of the foot (through an angle of about 10°).

A simple movement of rotation of the foot through an angle of between 20° and 35° suffices to disconnect the shoe from the pedal and to release the foot.

According to the invention, the movement of rotation in the disconnecting manoeuvre is made by moving the heel outwardly; this corresponds to the normal reflex of the cyclist who tends to put his foot down by spontaneously moving it outwardly.

FIGS. 4, 5 and 6 show a particular embodiment of the male block 4 used for carrying out the invention.

The block 4 is preferably constituted by two superposed, cylindrical coaxial pieces 22 and 23 of the same diameter, comprising holes 21. Bolts 24,24',25,25' passing through these holes 21 and the arcuate slots 21' made on the upper face of the plate 26 in the form of an upturned U, connect the three pieces, the slots 21' allowing the angular adjustment of the block 4 with respect to the plate 26. The piece 22, hereinafter called the body of the block, is located under piece 23, and comprises the recesses 16,16',17 and 17', regularly distributed on its periphery. These recesses comprise two portions 33 and 34 in the form of arcs of circle, separated by a bulge 35. The piece 23, hereinafter called the reinforcing piece, is made of metal of high mechanical strength, such as steel, and comprises semi-circular notches 29, regularly distributed over its periphery, but whose surface is smaller than that of the recesses made in the body 22 of the block.

The body 22 and the piece 23 are superposed as shown in FIG. 7.

The portion 33 of a recess 16,16',17 or 17' is covered by the reinforcing piece 23, whilst the notch 29 in piece 23 is situated above the portion 34 of the corresponding recess. Upon axial engagement of the block in the housing, in the direction of arrow F of FIG. 2, the lugs 14,14',15,15' penetrate into the recesses 16,16',17 and 17' through the notches 29; then, by rotation of the shoe, the lugs are located in the portion 33 of recesses and then bear on the lower face of the reinforcing piece 23. The piece 23 will be thinner than the height of the cylindrical portion 6' of the housing in which it is located to allow the movement of the lugs with a slight clearance. The lugs, once in the portion 33 of the recesses of the block, may make a movement of rotation either way by an amplitude of about 10°, around the axis of the block, whilst keeping the shoe connected to the pedal; this movement corresponds to the so-called physiological rotation of the foot, during the pedaling movement.

On the other hand, the block and the U-shaped plate may comprise a central circular hole 18 with a view to lightening the device and evacuating foreign bodies which might become lodged in the housing. The diameter of this hole is such that it reconciles the imperatives of lightness and mechanical strength.

The lateral arms of the U constituting the vertical uprights 27,28 of the plate 26 are fitted in the pedal along the long sides 27' and 28' thereof.

Slots 31' and 32' are provided on each upright 27 and 28, opposite holes 31 and 32 made on each side 27' and 28' of the pedal. A set of bolts 36 and 37 passing through said slots 31',32' and said holes 31 and 32 ensure, that the pedal is connected to the plate on each side. Inversely, the slots may be provided on the sides of the pedal and the holes on the vertical uprights of the plate 26.

The slots give the possibility of adjusting the position of the plate with respect to the sides of the pedal, i.e. of ensuring a correct positioning of the shoe with respect to the sides of the pedal; the connecting device may thus be adjusted both in height and transversely along the axis 3 of the pedal, so that, the connection being effected, the sides 27' and 28' of the pedal come to bear under the sole, this ensuring the abutment of the shoe on the pedal and giving the cyclist the normal sensation of abutment of the pedal which he is used to.

The device may be made from removable pieces, as described and illustrated in the drawings, with the result that the equipment according to the invention may be adapted from a plate 26 mounted on a conventional pedal; similarly, the shoe may be adapted by simply making a recess in the sole at the suitable spot to allow the housing 5 mounted on the support plate 10 to be positioned.

The assembly of a plate 26 supporting the block 4 is also possible on each face of the pedal.

In the embodiment according to the invention, it is seen that the pushing effort is transmitted in conventional manner between the sole of the shoe bearing (as recalled hereinabove) on the sides of the pedal; a contact also being made and obtained between the horizontal base of the housing and the upper plane of the block 4.

For pulling, when the pedal is raised, the effort is exerted from the whole shoe and sole to raise the plate 10 which rests on the whole periphery of the recess receiving the housing 5; the rivets 11,11' and 12,12' have only a function of connection and holding in place and do not ensure the transmission of the effort of the traction, this effort being distributed over the whole interface between the insole and the support plate 10, this avoiding any risk of tearing away.

However, the device according to the invention could also be made from a pedal comprising the block 4 integrated from the beginning therein; the block 4 could also be made in one piece, for example made of cast material.

The shoe could also be made with the housing incorporated therein and its support plate embedded in the mass of the sole from the beginning.

The different pieces, of which the block, housing, support plate of the block, are composed are standard and may be mounted on a right-hand or left-hand pedal, the differentiation being made upon assembly. Thus, the pieces are easily, assembled and changed due to their being standardized.

The device thus produced is particularly light and therefore does not represent any excess weight; on the contrary, it is made of particularly lightweight materials (light alloy or synthetic material) and results in a weight lower than that of presently known devices.

Its efficiency and simplicity are confirmed by experience.

The device according to the invention (i) ensures the rapid, simple and efficient connection and disconnection of the cyclist's shoe to and from the pedal; (ii) does not comprise any element projecting from the sole, which may hinder the user when occasionally walking; (iii) allows the so-called physiological horizontal rotation of the foot when pedaling; (iv) is designed to allow the adjustment of its different constituent elements with respect to one another in order thus to be adapted to the morphology and desiderata of the user, and to the type of cycling made; (v) is constituted by standard, easily assembled and produced elements.

What is claimed is:

1. A device for providing a positive pushing or pulling connection between a bicycle pedal and the shoe worn by the cyclist, said device comprising
   a cylindrical block
   a plate for supporting said cylindrical block with its cylindrical surface and one end surface exposed
   means for removably connecting said support plate to the pedal
   an open ended cylindrical housing adapted to axially receive said cylindrical block, said housing being disposed in the thickness of the sole of the cyclist's shoe,
   radially inwardly extending lugs fast with the internal wall of said housing
   circumferentially arranged recesses provided on the exposed surfaces of said block and adapted to axially receive said lugs, said recesses being L shaped in radial cross section to provide a bayonet type locking engagement when the lugs are angularly displaced after being axially received.

2. The device of claim 1, wherein the plate has a cross section in the form of an upturned U, the upper part of the U being flat for supporting the block, the downwardly directed arms of the U being disposed parallel and against the long sides of the pedal for adjustable positioning with respect to the long sides of the pedal, the arms of the U being connected to said long sides of the pedal by a set of bolts, said bolts passing through slots provided one of the elements to be assembled, thus enabling the respective positioning of the plate and the sides of the pedal to be adjusted.

3. The device of claim 2, wherein the block is fixed on the upper part of the U-shaped plate by a set of bolts passing through said block and through said upper part of the plate, and wherein arcuate slots are provided for the bolts, thus allowing the respective angular positioning of said plate and said block to be adjusted.

4. The device of claim 1, wherein the block comprises two generally circular, superposed, coaxial plates, having the same diameter; the first plate constituting the body of the block having recesses regularly distributed on its periphery; the second plate, which serves as a reinforcing piece, made of metal of high mechanical strength, such as steel, the first plate and also is provided with notches regularly distributed on its periphery, but of smaller area than the recesses in the first plate said notches partially covering said recesses so as to form together L-shaped recesses adapted to receive the lugs, said lugs being of a shape complementary to that of the notches.

5. The device of claim 1 wherein the housing is fast with a plate outwardly extending from said housing and said plate is connected to the sole of the shoe in the zone surrounding this housing by a set of rivets.

6. The device of claim 1, wherein the housing comprises a cylindrical portion and a coaxial truncated portion, the small diameter of the truncated portion being equal to that of the cylindrical portion and its larger diameter being located at the base of said housing, thus enabling the penetration of the block in said housing to be guided, the cylindrical portion having a diameter allowing the block to fit with a slight clearance.

* * * * *

UNITED STATES PATENT OFFICE
CERTIFICATE OF CORRECTION

Patent No. 4,298,210            Dated November 3, 1981

Inventor(s) Jacques Lotteau, Jacques Bruker and Charles Freche

It is certified that error appears in the above-identified patent and that said Letters Patent are hereby corrected as shown below:

Column 2, line 66, change "Axially" to --Radially--.

Column 2, line 68, change "join" to --joining--.

Signed and Sealed this

Nineteenth Day of January 1982

[SEAL]

Attest:

GERALD J. MOSSINGHOFF

Attesting Officer      Commissioner of Patents and Trademarks